(12) United States Patent
Sogou

(10) Patent No.: US 10,091,969 B2
(45) Date of Patent: Oct. 9, 2018

(54) ANIMAL LITTER

(71) Applicant: UNICHARM CORPORATION, Ehime (JP)

(72) Inventor: Tatsuya Sogou, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 130 days.

(21) Appl. No.: 15/038,471

(22) PCT Filed: Nov. 21, 2014

(86) PCT No.: PCT/JP2014/080892
§ 371 (c)(1),
(2) Date: May 22, 2016

(87) PCT Pub. No.: WO2015/076366
PCT Pub. Date: May 28, 2015

(65) Prior Publication Data
US 2016/0262341 A1    Sep. 15, 2016

(30) Foreign Application Priority Data

Nov. 25, 2013   (JP) ................. 2013-243252

(51) Int. Cl.
A01K 29/00   (2006.01)
A01K 1/015   (2006.01)
A01K 1/01    (2006.01)

(52) U.S. Cl.
CPC .......... *A01K 1/0154* (2013.01); *A01K 1/0114* (2013.01); *A01K 1/0152* (2013.01); *A01K 1/0155* (2013.01)

(58) Field of Classification Search
CPC .. A01K 1/0154; A01K 1/0114; A01K 1/0152; A01K 1/0155; A01K 1/0107
See application file for complete search history.

(56) References Cited

U.S. PATENT DOCUMENTS 6,371,050 B1   4/2002  Mochizuki
2001/0009142 A1*  7/2001  Otsuji ................. A01K 1/0107
                                                       119/165

(Continued)

FOREIGN PATENT DOCUMENTS

EP    1614345 A1    1/2006
EP    2832212 A1    2/2015

(Continued)

OTHER PUBLICATIONS

Extended European Search Report in EP application No. 14863295.3, dated Oct. 14, 2016.

(Continued)

*Primary Examiner* — Trinh T Nguyen
(74) *Attorney, Agent, or Firm* — Hauptman Ham, LLP

(57) ABSTRACT

Provided is toilet sand for animals which retains satisfactory liquid permeability and can absorb, with the lapse of time, any liquid remaining on the surface and which can be prevented from generating dust when in use, etc. The toilet sand for animals comprises a plurality of granules, each of the granules comprising: a core configured of an inorganic porous material and a binder with which particles of the inorganic porous material are integrally affixed; and a water-blocking coating layer formed on the surface of the core and configured of a water-blocking material which has water-absorbing properties and which, in the state of having absorbed water, has viscosity. Preferably, the water-blocking material is configured of one or more substances selected from the group consisting of ethylene/vinyl acetate copolymers, polyvinyl alcohol, and starch.

20 Claims, 1 Drawing Sheet

(56) References Cited

U.S. PATENT DOCUMENTS

| 2005/0005870 | A1* | 1/2005 | Fritter | A01K 1/0152 119/173 |
| 2009/0211532 | A1 | 8/2009 | Matsuo et al. | |
| 2009/0314215 | A1* | 12/2009 | Hurwitz | A01K 1/0152 119/171 |

FOREIGN PATENT DOCUMENTS

| JP | 2008-193938 A | 8/2008 |
| JP | 2011-217638 A | 11/2011 |
| JP | 5255970 B2 | 8/2013 |
| JP | 2013-202038 A | 10/2013 |
| JP | 2013-220381 A | 10/2013 |

OTHER PUBLICATIONS

International Search Report in PCT/JP2014/080892, dated Feb. 24, 2015.

\* cited by examiner

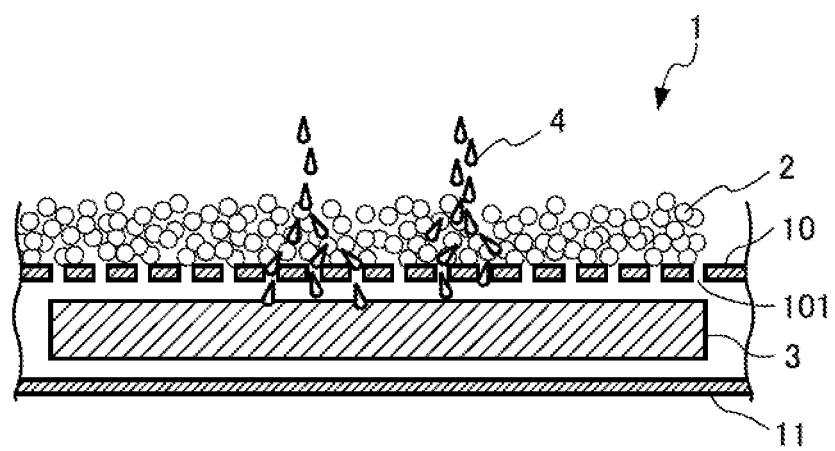

ANIMAL LITTER

RELATED APPLICATIONS

The present application is a National Phase entry of International Application No. PCT/JP2014/080892, filed Nov. 21, 2014, which claims priority of Japanese Application No. 2013-243252, filed Nov. 25, 2013.

TECHNICAL FIELD

The present invention relates to animal litter.

BACKGROUND ART

Heretofore, a litter box for animals such as cats and dogs kept as pets is provided with a box-like litter container with an open upper part and granular animal litter contained in the litter container. As a type of a litter box for animals, a unit animal litter box provided with: an upper container the bottom of which is configured to be liquid permeable; and a lower container arranged below the upper container and in which a liquid absorbent member is placed has been known. In such a unit animal litter box, animal litter is placed in the upper container, and animal urine passes through the animal litter placed in the upper container and is absorbed by the liquid absorbent member in the lower container.

The animal litter for the unit animal litter box preferably has superior liquid permeability in order to quickly transfer a large quantity of liquid excreted during urination by an animal etc. to the lower container. In addition, a small amount of liquid remaining on a surface of the litter needs to be absorbed by the litter with the lapse of time, in order to prevent an odor. As discussed above, the litter for the unit animal litter box is required to have, simultaneously, liquid permeability and property of absorbing the liquid remaining on the surface thereof.

As such animal litter used for the unit animal litter box, animal litter configured of a plurality of granules, the granule including a group of particles configured of an inorganic porous material and a binder which binds the group of particles together has been proposed (refer to Patent Document 1).

The animal litter according to the abovementioned art can absorb the liquid remaining on the surface thereof with the lapse of time.

Patent Document 1: Japanese Unexamined Patent Application Publication No. 2008-193938

DISCLOSURE OF THE INVENTION

Problems to be Solved by the Invention

Animal litter is distributed in a state of being packed in a bag of a predetermined quantity (e.g., 10 kg) and is poured into an animal litter box from the bag before use. The animal litter configured of a plurality of granules which are configured mainly of the inorganic porous material is a heavy object, and particles of the inorganic porous material may partially detach from the granules due to shock during distribution and shock during pouring into the animal litter box.

The particles thus detached from the animal litter may disperse as dust during pouring of the animal litter into the animal litter box, or during use of the animal litter box by an animal. In addition, the particles may adhere to paws of the animal during use of the animal litter box, and soil the surrounding area. Furthermore, the particles may be introduced to the body of the animal through the mouth.

Given the above, an objective of the present invention is to provide animal litter which retains satisfactory liquid permeability and can absorb, with the lapse of time, liquid remaining on the surface and which can prevent generation of dust during use, etc.

Means for Solving the Problems

One aspect of the present invention relates to an animal litter including a plurality of granules. Each of the granules includes: a core configured to include an inorganic porous material and a binder which binds the inorganic porous material together; and a water-blocking coating layer formed on the surface of the core and configured of a water-blocking material which has water-absorbing properties and which, in the state of having absorbed water, has viscosity.

An initial water absorption rate of the core is preferably 20 to 30%.

The water-blocking material is preferably configured to include at least one type selected from the group consisting of ethylene/vinyl acetate copolymers, polyvinyl alcohol, and starch.

The inorganic porous material is preferably configured to include at least one type selected from the group consisting of zeolite, sepiolite, attapulgite, diatomite, and diatom shale.

The binder is preferably an inorganic binder.

The granules, each has preferably a cylindrical shape of 4 to 8 mm in diameter and 6 to 20 mm in height.

The granules, each has preferably an average mass of 0.08 to 1.37 g/piece.

The animal litter is preferably placed in an upper container of a unit animal litter box. The unit animal litter box includes: the upper container having a plurality of holes on a bottom and in which the animal litter is placed; and a lower container arranged below the upper container and in which a liquid absorbent member is placed.

Further aspect of the present invention relates to a unit animal litter box kit including the unit animal litter box and the animal litter described above.

Effects of the Invention

According to the present invention, animal litter which retains satisfactory liquid permeability and can absorb, with the lapse of time, any liquid remaining on the surface and which can prevent generation of dust during use, etc. can be provided.

BRIEF DESCRIPTION OF THE DRAWINGS

FIG. 1 is a partial enlarged view of a cross section of a unit animal litter box, illustrating a mode of usage of the animal litter according to the present invention.

PREFERRED MODE FOR CARRYING OUT THE INVENTION

An embodiment of the present invention is described in detail hereafter.

In the present embodiment, "animal" includes so-called pets such as dogs, cats, rabbits, hamsters, etc., as well as baby tigers, baby lions, etc. Also, the term "litter" means a mass of granular materials formed in the shape of spheres, revolving ellipsoids or polyhedrons. The term "liquid" means all fluid mass which is excreted by animals and is capable of passing through the litter of the present embodiment. The animal litter may be simply referred to as "litter" hereinafter.

<Mode of Usage of Animal Litter>

First, a mode of usage of the animal litter according to the present embodiment will be described with reference to the drawings.

FIG. 1 is a partial enlarged view of a cross section of a unit animal litter box 1, illustrating a mode of usage of the animal litter according to the present invention.

As illustrated in FIG. 1, a unit animal litter box 1 includes: an upper container 10 in which animal litter 2 is placed; and a lower container 11 disposed below the upper container 10, and a liquid absorbent member 3 is placed therein.

The upper container 10 has a plurality of holes 101 on a bottom. Preferably, the holes 101 are in a polyhedral or circular shape and in a size to prevent the animal litter 2 from passing therethrough.

As illustrated in FIG. 1, it is preferable that the animal litter 2 is placed on the bottom of the upper container 10 in a thickness of at least 10 mm. In a case in which a user animal is a cat, the thickness of the animal litter 2 to be placed is more preferably at least 20 mm since the cat scratches the animal litter 2 after excretion trying to hide excrement. The liquid absorbent member 3, which is exchangeable, is placed in the lower container 11.

As illustrated in FIG. 1, liquid 4, which is urine excreted by the animal, passes between the animal litter 2 and then through the holes 101 formed on the bottom of the upper container 10. The liquid 4 having passed through the holes 101 is absorbed by the liquid absorbent member 3 placed in the lower container 11. A small amount of the liquid 4 remaining on a surface of the animal litter 2 is eventually absorbed by the animal litter 2 with the lapse of time.

The animal litter according to the present embodiment, which is later described in detail, retains satisfactory liquid permeability and can absorb, with the lapse of time, any liquid remaining on the surface. The animal litter according to the present embodiment can therefore be used preferably with the unit animal litter box 1.

<Configuration of Animal Litter>

The animal litter of the present embodiment includes a plurality of granules.

The granules each include a core and a water-blocking coating layer.

The core of the granule in the present embodiment is configured to include an inorganic porous material and a binder which binds the inorganic porous material together.

Zeolite, sepiolite, attapulgite, diatomite, diatom shale, etc. can be exemplified as the inorganic porous material used in the present embodiment. In the present embodiment, one of these can be used, or two or more can be used in mixture. Since the inorganic porous materials have a property of absorbing ammonia odor or the like, configuring a granule(s) mainly with the inorganic porous particles allows animal litter with excellent odor eliminating ability to be provided.

An average particle size of a particle of the inorganic porous material is preferably small, in light of enhancing strength of the granule of the litter. More specifically, it is preferable that the average particle size of the inorganic porous particles used in the present embodiment be no greater than 300 μm, more preferably no greater than 200 μm, and most preferably no greater than 100 μm. As used herein, the average particle size is an average particle size measured by using a vibratory sieve shaker AS-200 manufactured by Retsch GmbH.

It is preferable that the content of the inorganic porous material in the core of the granule in the present embodiment be from 50 to 95% by mass, and more preferably 70 to 90% by mass. If the content of the inorganic porous material in the core is less than 50% by mass, the odor eliminating effect of the granule may decrease. In addition, if the content of the inorganic porous material particle in the core is more than 95% by mass, the granule may not have sufficient strength.

As the binder contained in the core of the granule in the present embodiment, either an organic binder or an inorganic binder can be used however, the inorganic binder is preferable in light of attaining sufficient strength of the granule.

As the inorganic binder, either cement or a non-cement solidifier can be used. It should be noted that cement refers to a solidifier having a principal component of calcium silicate, and is hardened through reaction with water (hydration); the non-cement solidifier refers to a solidifier other than cement, that is, having a principal component that is not calcium silicate. Dolomite, calcium oxide, calcium sulfate, magnesium oxide, etc. can be exemplified as the non-cement solidifier.

As the inorganic binder, it is preferable to use a mixture of a hydraulic-setting solidifier configured mainly of calcium sulfate a d magnesium oxide, which are non-cement solidifiers, and cement. Use of such a mixture as the inorganic binder allows for an increase in the strength of the granules, and suppression of an increase in pH of the granules caused by use of cement. Suppression of an increase in pH of the granule(s) can suppress ammonia generation from urine. This is because it becomes difficult to cause an ammonia release reaction from urine when the urine comes into contact with the granule(s).

Portland cement, white cement, etc. can be exemplified as the cement used in the present embodiment.

In addition, it is preferable to use low alkali cement in the present embodiment. The low alkali cement is made by adjusting an alkali metal (Na, K) content of the cement so as to be lower than a predetermined content. The use of the low alkali cement allows for a further decrease in the pH of the granules.

The binder content in the core of the granule is preferably from 5 to 30% by mass, and more preferably from 10 to 20% by mass. If the entire binder content is less than 5% by mass, the granule may not achieve sufficient strength. On the contrary, if the entire binder content is greater than 30% by mass, the odor eliminating effect of the granule may decrease.

In the case of the inorganic binder being used, the non-cement solidifier content in the inorganic binder is preferably at least 20% by mass, and more preferably at least 40% by mass. If the non-cement solidifier content is less than 20% by mass, the pH of the granule may not decrease sufficiently.

A pozzolanic material can also be added to the core, in addition to the article of inorganic porous material and the inorganic binder. A pozzolanic material is a generic term for a fine powder having a principal component of silica, and is a material which reacts with calcium hydroxide, thereby generating calcium-silicate hydrate, which is stably insoluble silica gel, diatomite, diatom shale, or the like can be exemplified as the pozzolanic material. Addition of such pozzolanic material allows a further decrease in the pH of the granule(s).

This is because the pozzolanic reaction, which is caused when calcium hydroxide generated through the hydration reaction of the cement components in the core reacts with the silicic acid, reduces the amount of the calcium hydroxide in the cement.

As mentioned above, a decrease in pH of the core may suppress ammonia generation. Alternatively, since such pozzolanic material has an odor absorbing property of components such as ammonia, an absorption effect of ammonia by the pozzolanic material also may suppress ammonia generation.

Moreover, there is another effect of improving the strength of the core (granule), by the bonding force of calcium-silicate hydrate, which is generated through the pozzolanic reaction.

An initial water absorption rate of the core is preferably 20 to 30%. By configuring the core of the present embodiment mainly of the inorganic porous material, the initial water absorption rate can be reduced. The initial water absorption rate of a granule configured mainly of fiber obtained by pulverizing pulp, waste paper, etc. is 40 to 100%, which is higher than the initial water absorption rate of the core configured mainly of the inorganic porous material in the present embodiment. In the case of woodchips, the surface of the core may collapse and drop on contact with moisture.

A method of obtaining the initial water absorption rate is explained hereinafter. First, a cylinder of 50 mm in diameter and 30 mm in depth was provided on the top surface of a grating with a large number of openings of 3 mm×8 mm. The cylinder was filled with the cores (without the water-blocking coating layer described later), and 20 ml of normal saline solution was added thereto dropwise from a height of 20 mm above an upper end of the cylinder over a period of 10 seconds. And then, the normal saline solution attached to the surface of the core was quickly wiped off, and an increase in mass of the core (mass of the normal saline solution absorbed by the core) was measured, the mass of the increment being referred to as B. The initial water absorption rate can be obtained by the following equation.

Initial water absorption rate (%)=$B/20\times100$

If the initial water absorption rate of the core is lower than 20%, supposing that the granule breaks after long term use, the liquid tends to remain on the surface where the core is exposed and generation of odor is more likely. On the contrary, if the initial water absorption rate of the core is higher than 30%, supposing that the granule breaks after long term use, a large amount of liquid is absorbed by an inner part of the core from the surface where the core is exposed, and generation of odor is more likely. In addition, as a large amount of liquid is absorbed by the inner part of the core, the granule tends to swell and break if the granule swells and breaks, the liquid permeability of the animal litter decreases. In other words, with the initial water absorption rate of the core being 20 to 30%, the litter according to the present embodiment can endure long use.

The water-blocking coating layer in the present embodiment is formed on the surface of the core and composed of a water-blocking material which has water-absorbing properties and which, in the state of having absorbed water, has viscosity. As used herein, the "water-blocking material" is a material that can absorb liquid with the lapse of time, or hardly absorbs liquid temporarily in contact therewith.

The water-blocking coating layer formed on the surface of the core of the granule provides superior liquid permeability. In other words, with the presence of the water-blocking coating layer on the surface of the core, a major part of the liquid excreted during urination by an animal etc. is prevented from being absorbed by the litter and passes between the granules. Meanwhile, the liquid remaining on the surface of the granule is absorbed by the water-blocking material and incorporated into the core with the lapse of time. As a result, the litter of the present embodiment can prevent generation of odor due to decay of urine remaining on the granule surface. Furthermore, the water-blocking material in the water-blocking coating layer formed on the surface of the core joins particles of the inorganic porous material, thereby preventing generation of dust from the litter.

As the water-blocking material which has water-absorbing properties and which, in the state of having absorbed water, has viscosity, ethylene-vinyl acetate copolymer (EVA), polyvinyl alcohol (PVA), starch, persimmon tannin, pine resin, gelatin, etc. can be exemplified. Preferably, the water-blocking material is configured to include one or more substances selected from the group consisting of ethylene-vinyl acetate copolymer, polyvinyl alcohol, and starch. The water-blocking material configured to include these substances allows more efficient incorporation of the liquid, which is attached to the granule surface, into the core. More preferably, the water-blocking material is configured to include ethylene-vinyl acetate copolymer.

As discussed heretofore, the water-blocking material is water absorbing. As used herein, "water absorbing" means that a material can absorb at least 1 ml water per unit mass (1 g). The "water absorbing" property can be determined by measuring an amount of water absorbed by the material by: immersing a sample of 50 g in 300 ml water; letting the material stand at 25° C. for 10 minutes; and measuring an increase in mass of the sample.

In addition, the water-blocking material, in the state of having absorbed water, has viscosity. As used herein, "in the state of having absorbed water, has/have viscosity" means to have fluidity in the state of having absorbed water. More specifically, if 10 g of the water-blocking material dissolved or dispersed in 1 L of water has viscosity of at least 1.004 mPa·s at room temperature, the water-blocking material is considered to "in the state of having absorbed water, have viscosity".

The water-blocking coating layer preferably covers at least 70% of the core surface, and more preferably covers at least 90% of the core surface. The water-blocking coating layer covering at least 90% of the core surface allows the litter to exert superior liquid permeability.

The thickness of the water-blocking coating layer is preferably 0.1 to 300 μm, and more preferably 1 to 100 μm. If the thickness of the water-blocking coating layer is less than 0.1 μm, the water-blocking coating layer tends to drop off or dissolve during use of the litter; and if the thickness of the water-blocking coating layer is greater than 300 μm, incorporation of the liquid attached to the granule surface into the core tends to be more difficult.

The granules in the present embodiment preferably each have a cylindrical shape of 4 to 8 mm in diameter and 6 to 20 mm in height. Such dimension and shape can alleviate reluctance of cats, etc. to excrete on the litter.

An average mass of the granules is preferably 0.08 to 1.37 g/piece. Litter composed of granules having an average mass within such a range can alleviate reluctance of cats, etc. to excrete.

It is preferable that the average particle pH of the core of the granule in the present embodiment is not greater than 12. An average particle pH of the core of no greater than 12 can suppress ammonia generation.

The average particle pH of the core can be measured according to the following pH Measuring Method.

<pH Measuring Method>

The core is pulverized, sieved using an 80-mesh sieve, and pieces having passed through the sieve are collected as a test sample.

2.5 ml of distilled water is added dropwise to 1 g of test sample, slightly stirred, and then let stand.

30 minutes later, the pH of the test sample is measured using a pH meter (manufactured by HANNA Instruments, Skincheck).

<Manufacturing Method of Animal Litter>

A manufacturing method for the animal litter of the present embodiment is described hereinafter.

The core configuring the litter of the present embodiment is granulated from a mixture including the inorganic porous material and the binder. First, the inorganic porous material and the binder are mixed in predetermined proportions, water is added thereto, and then the mixture is stirred and mixed uniformly using a mixer so as to prevent the generation of clumps.

In the case of including a pozzolanic material such as silica gel in the core, the pozzolanic material is mixed, along with the inorganic porous material and the binder, during the stirring and mixing step.

The core is granulated using this mixture. The core in the present embodiment can be granulated by means of a granulator for various fine particles such as a disk pelletizer, a briquette machine, a table ting machine, etc.

And then, the core thus obtained is let stand for a predetermined period of time for solidification of the binder and the pozzolanic reaction. This step is referred to as a curing step. It is preferable that the curing period be 72 hours or more in light of sufficient solidification of the cement, though it differs according to temperature.

Thereafter, the core sufficiently solidified is dried using a dryer. This drying step is performed by way of a rotary kiln dryer, for example. It is preferable that drying is performed so that moisture percentage of the core is no higher than 10%.

The moisture percentage is obtained by further drying the dried core for 24 hours at 110° C., regarding the difference in mass of the core before and after the further drying as a moisture content of the core, and dividing the moisture content by the mass of the core before the further drying.

The core thus dried is then coated with the water-blocking material.

The water-blocking material is dissolved or dispersed in water in advance, and the water-blocking material dissolved liquid or dispersed liquid is sprayed. B spraying the water-blocking material dissolved liquid or dispersed liquid onto the dried core, which is at 80 to 100° C., moisture is evaporated to form a film of the water-blocking material on the core surface.

In a sifting step, larger and smaller granules are removed from the cores (granules) thus coated with the water-blocking material, resulting in obtaining granules of a predetermined.

The animal litter of the present invention is thus manufactured.

<Unit Animal Litter Box Kit>

The animal litter according to the above discussed embodiment can be used with the unit animal litter box 1, as a unit animal litter box kit. According to the unit animal litter box kit, the animal litter, which retains satisfactory liquid permeability and can prevent generation of dust during use, can be provided along with a unit animal litter box most suitable for the litter.

EXAMPLES

The present invention is described in more detail hereinafter based on Examples; however, the present invention is not limited thereto.

Example 1

(1) Mixing of Raw Materials and Granulation of Core

Zeolite powder (product of Ayashi, Miyagi Prefecture, 60-mesh pass product, average particle diameter of 150 µm, moisture of no more than 7%) of 70 parts by mass, 10 parts by mass of a non-cement solidifier (components: 30% by mass of calcium sulfate hemihydrate, 15% by mass of magnesium oxide, and 5% by mass of other metal oxides), 10 parts by mass of white cement (manufactured by Taiheiyo Cement Corporation), and 10 parts by mass of C-type silica gel (product of Qingdao, China) were mixed, followed by adding 40 parts by mass of water, and then stirred and mixed using a lodige mixer.

The stirred and mixed mixture was compressed and granulated by a disk pelletizer (manufactured by Dalton, Co., Ltd.). The outlet opening dimension of the disk was 5.5 mm in diameter, 35 mm in disk thickness, and 12 mm in effective length.

The core thus obtained had a cylindrical shape of 5.5 mm in diameter and 25 mm in height.

(2) Curing Step

The core thus obtained was let stand for 72 hours at room temperature of 20° C. to allow for solidification of cement and the pozzolanic reaction.

(3) Drying Step

The core having been subjected to the curing step was dried until the resulting moisture percentage was no greater than 10% by using a rotary kiln dryer. In the drying step, the granules shrunk in size, and cracking occurred in a portion of each granule. As a result, the core obtained after the drying step was 5.5 mm in diameter and 9 mm in average particle length. The pH of the core after the drying step was 10.0. The pH of the core after the drying step was measured according to the pH Measuring Method described above.

(4) Coating Step

As the water-blocking material, EVA (ELOTEXFX2350 manufactured by AkzoNobel) was used. A dispersed liquid, in which the water-blocking material was dispersed in water of 10 times the mass thereof, was applied in an amount of 5% by mass with respect to the mass of core. The application was performed by spraying the water-blocking material dispersed liquid as the cores were agitated and mixed, while the cores obtained after the drying step were at high temperature (100° C.).

(5) Sifting Step

The resulting granules were sifted through a sieve with a 10 mm×10 mm mesh to remove granules larger than a predetermined size, and then sifted through a sieve with a 5 mm×10 mm mesh to remove granules and powdery matter smaller than the predetermined size. As a result, granules within a predetermined range of sizes were provided.

In this manner, the animal litter of the first working example was provided. An average mass of the granules of the litter was 850 g/L.

Example 2

Animal litter of Example 2 was obtained by a method similar to Example 1, except for, in (4) of Example 1, employing PVA (Poval manufactured by Kuraray) as the water-blocking material, and applying an aqueous solution, in which the water-blocking material was dissolved in water of 100 times the mass thereof, in an amount of 10% by mass with respect to the mass of core. An average mass of the granules of the litter of Example 2 was 850 g/L.

Example 3

Animal litter of Example 3 was obtained by a method similar to Example 1, except for, in (4) of Example 1, employing starch (SUNALFANTZ manufactured by Asahi Chemical Co., Ltd.) as the water-blocking material, and applying an aqueous solution, in which the water-blocking material was dissolved in water of 100 times the mass thereof, in an amount of 10% by mass with respect to the mass of core. An average mass of the granules of the litter of Example 3 was 850 g/L.

Comparative Example

Animal litter of Comparative Example was obtained by a method similar to Example 1, except for omitting the coating step (4) of Example 1 to obtain granules with cores without the water-blocking coating layer. An average mass of the granules of the litter of Comparative Example was 850 g/L.

Measurement of water absorption property, measurement of liquid permeability, and dust generation test were conducted in the following methods for the animal litter obtained in Examples and Comparative Example.

[Measurement of Liquid Permeability]

A cylinder of 50 mm in diameter and 30 mm in depth was provided on the to surface of a grating having many openings of 3 mm×8 mm in size. The cylinder was filled with the animal litter obtained in Examples and Comparative Example, and 20 ml of normal saline solution was added dropwise from a height of 20 mm above, an upper and of the cylinder over a period of 10 seconds. A tray accommodating the normal saline solution that passed through the granules and the grating was provided under the bottom of the grating, and the mass (A) of the normal saline solution having passed through the grating after 15 seconds had elapsed upon completion of dripping was measured. Liquid permeability was obtained by the following equation. Results are shown in Table 1.

Fluid Penetration (%)=$A/20 \times 100$

[Dust Generation Test]

1.8 kg (2 L) of respective animal litters obtained in Examples and Comparative Example was packed in a plastic bag, and 8 of such bags for each litter made two round trips by car between Tokyo and Shikoku (Kagawa Prefecture). The animal litter after the transport was sieved with a sieve of 2 mm mesh and a mass of powdery matter having passed through the sieve was measured. An average mass of the fallen powdery matter for 8 bags is shown in Table 1.

TABLE 1

|  |  | Example 1 | Example 2 | Example 3 | Comparative Example |
|---|---|---|---|---|---|
|  | Water-Blocking Material | EVA | PVA | Starch | — |
| Test Results | Liquid Permeability (%) | 94.6 | 94.3 | 95.2 | 95 |
|  | Dust Generation Test (g/bag) | 0.116 | 0.115 | 0.120 | 1.992 |

As is apparent from the results shown in Table 1, the animal litters of Examples had superior liquid permeability. In addition, it was proven that the animal litters of Examples did not completely absorb the liquid in contact therewith and had proper absorbent property. Furthermore, the animal litters of Examples caused less dust generation during transport.

DESCRIPTION OF REFERENCE NUMERALS

1 Unit animal litter box
2 Animal litter
3 Liquid absorbent member
4 Liquid
10 Upper container
11 Lower container
101 Holes

The invention claimed is:

1. An animal litter, comprising:
   a plurality of granules,
   wherein
   each of the granules includes:
      a core including an inorganic porous material and a binder which binds the inorganic porous material together; and
      a water-blocking coating layer formed on a surface of the core and including a water-blocking material which has water-absorbing properties and which, in a state that the water-blocking material has absorbed water, has viscosity,
   the water-blocking coating layer covers at least 70% of the surface of the core, and
   in the state that the water-blocking material has absorbed water, 10 g of the water-blocking material dissolved or dispersed in 1 L of water has the viscosity of at least 1.004 mPa·s at room temperature.

2. The animal litter according to claim 1, wherein
   an initial water absorption rate of the core is 20 to 30%.

3. The animal litter according to claim 1, wherein
   the water-blocking material includes at least one selected from the group consisting of ethylene/vinyl acetate copolymers, polyvinyl alcohol, and starch.

4. The animal litter according to claim 1, wherein
   the inorganic porous material includes at least one selected from the group consisting of zeolite, sepiolite, attapulgite, diatomite, and diatom shale.

5. The animal litter according to claim 1, wherein
   the binder is an inorganic binder.

6. The animal litter according to claim 1, wherein
   each of the granules has a cylindrical shape of 4 mm to 8 mm in diameter and 6 mm to 20 mm in height.

7. The animal litter according to claim 1, wherein
   each of the granules has an average mass of 0.08 to 1.37 g/piece.

8. The animal litter according to claim 1, wherein the animal litter is placed in an upper container of an animal litter box including:

the upper container having a plurality of holes on a bottom of the upper container and in which the animal litter is placed; and a lower container arranged below the upper container and in which a liquid absorbent member is placed.

9. An animal litter box kit, comprising:
an animal litter box including
an upper container having a plurality of holes;
a lower container below the upper container; and
an animal litter placed in the upper container;
wherein
the animal litter includes a plurality of granules,
each of the granules includes:
a core including an inorganic porous material and a binder which binds the inorganic porous material together; and
a water-blocking coating layer formed on a surface of the core and including a water-blocking material which has water-absorbing properties and which, in a state that the water-blocking material has absorbed water, has viscosity,
the water-blocking coating layer covers at least 70% of the surface of the core, and
in the state that the water-blocking material has absorbed water, 10 g of the water-blocking material dissolved or dispersed in 1 L of water has the viscosity of at least 1.004 mPa·s at room temperature.

10. The animal litter according to claim 1, wherein a thickness of the water-blocking coating layer is in a range of 0.1 μm to 300 μm.

11. The animal litter according to claim 1, wherein the water-blocking material is a film that covers at least 70% of the surface of the core.

12. The animal litter according to claim 1, wherein the binder is cement or a non-cement solidifier.

13. The animal litter according to claim 12, wherein in said each of the granules, the binder is 5%-30% by mass in the core.

14. The animal litter according to claim 2, wherein the water-blocking material includes at least one selected from the group consisting of ethylene/vinyl acetate copolymers, polyvinyl alcohol, and starch.

15. The animal litter according to claim 14, wherein the inorganic porous material includes at least one selected from the group consisting of zeolite, sepiolite, attapulgite, diatomite, and diatom shale.

16. The animal litter according to claim 15, wherein the binder is an inorganic binder.

17. The animal litter according to claim 16, wherein each of the granules has a cylindrical shape of 4 mm to 8 mm in diameter and 6 mm to 20 mm in height.

18. The animal litter according to claim 17, wherein each of the granules has an average mass of 0.08 to 1.37 g/piece.

19. The animal litter according to claim 18, wherein a thickness of the water-blocking coating layer is in a range of 0.1 μm to 300 μm.

20. The animal litter according to claim 19, wherein the water-blocking material is a film that covers at least 70% of the surface of the core.

* * * * *